BINARY TO DECIMAL MATRIX CONVERTER

Filed Nov. 24, 1959 2 Sheets-Sheet 1

INVENTORS
W. W. DAVIS
A. V. POHM

BY Cushman, Darby & Cushman
ATTORNEYS

BINARY TO DECIMAL MATRIX CONVERTER

Filed Nov. 24, 1959 2 Sheets-Sheet 2

INVENTORS
W. W. DAVIS
A. V. POHM

BY Cushman, Darby & Cushman
ATTORNEYS

United States Patent Office 3,159,828 Patented Dec. 1, 1964

3,159,828
BINARY TO DECIMAL MATRIX CONVERTER
William W. Davis, Minneapolis, Minn., and Arthur V. Pohm, Ames, Iowa, assignors to Sperry Rand Corporation, New York, N.Y., a corporation of Delaware
Filed Nov. 24, 1959, Ser. No. 855,206
16 Claims. (Cl. 340—347)

This invention relates generally to magnetic circuits and more specifically to circuits in which there are a plurality of output lines, any one of which may be selected according to the particular permutations of an input code combination.

In digital computing machines frequent use is made of apparatus which is capable of decoding a binary code thereby yielding a decimal indication of said binary code. In a typical decimal translator there are provided four input lines, each of which is capable of accepting one of two possible signals, representative of a binary "1" or "0." Also provided is a set of ten output lines one of which, when energized, is indicative of a decimal digit 0 through 9. The particular output line which is energized is dependent on the particular code permutation impressed on the input terminals.

Many different arrangements of various circuit components have been used in the past to accomplish the desired function. A typical example is a device termed a magnetic-matrix multi-position switch which consists of a plurality of saturable core transformers, there being one such transformer for each output of the switch. The primaries of these transformers are connected in series to a common driving source while the secondary windings individually form the output windings of the device. The control windings which are used to bias the transformer cores are connected in a binary scheme to double-throw mechanical switches in such a way that, for each combination of switch positions, one and only one of the cores is not in a saturated condition. When a drive signal is applied an output will be observed only at the secondary winding associated with the unsaturated core.

As used herein the term "word," which is employed interchangeably with the term "number," means data represented in a series of binary bits.

The illustrated embodiment of the present invention utilizes the saturable transformer properties of thin ferromagnetic films, such as the type prepared by vacuum deposition of a nickel-iron alloy under the influence of an orienting magnetic field. It is to be understood, however, that we do not intend to limit our invention to these particular devices since those skilled in the art may easily contrive means for otherwise implementing the invention without departing from the scope thereof. It will become apparent after reading our specification how one may implement other code translating apparatus such as binary to reflected-binary (Gray code), 80 or 90-column tabulation card code to decimal code, etc.

In the illustrative embodiment, a plurality of means for blocking or propagating a signal, i.e, a plurality of saturable transformer devices, here in the form of magnetic films, are arranged in a cascaded matrix configuration and initially biased to one of two states or degrees of saturation according to a predetermined scheme. Also provided is a secondary biasing means which is rendered operative in accordance with the permutations of the code being translated. To read out the decimal representation of the particular binary code permutation under consideration a driver circuit is activated which applies a field to all films in the highest order bit position. Since the films are cascaded, the output signal resulting from the switching of certain ones of said highest order bit films, is used as an input driving signal for the next lower order bit position films. As a result, a signal will be propagated through the matrix from the highest to the lowest order bits and, because of the manner in which the matrix is originally biased, an output signal will appear on only one line, thereby indicating the decimal number corresponding to the particular binary coded input.

It is accordingly an object of the present invention to provide an electronic translating circuit.

Another object of our invention is to provide an improved translating circuit which is capable of operating at substantially higher rates than can be obtained with prior art devices.

A further object of the present invention is to provide a circuit for blocking or propagating a signal.

Yet another object in conjunction with the foregoing object is to provide a translator which utilizes the high switching speeds inherent in thin deposited ferromagnetic films to perform the desired function.

Still another object of the present invention lies in the use of the saturable transformer properties of thin ferromagnetic films to implement a digital translator.

Yet still other objects, advantages, manner of construction, and the operation of the present invention will become more readily apparent to those skilled in the art from the following detailed description of the accompanying drawings wherein.

Figure 1:
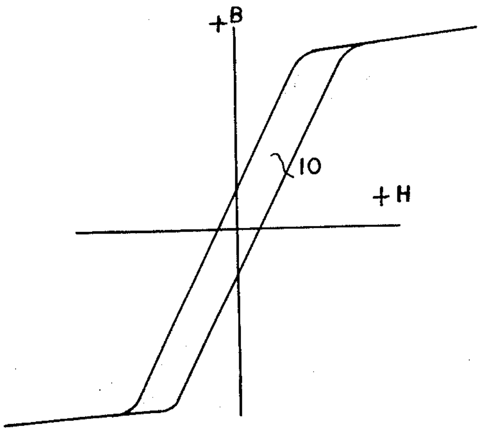
FIGURE 1 illustrates a typical hysteresis loop for a thin ferromagnetic film when a field is applied parallel to the film's difficult or hard direction of magnetization.

It has been found that thin ferromagnetic films prepared according to the teachings of the Rubens application, Serial No. 599,100, filed July 20, 1956, now Patent No. 2,900,282, have substantial anisotropy in that said films have a preferred axis of magnetization termed the "easy" direction as well as a difficult axis termed the "hard" direction, which lies in the plane of the film but orthogonal to said "easy" direction. FIGURE 1 illustrates the shape of the hysteresis loop obtained when a magnetic field is applied to a thin film type core in the hard direction increased from zero oersteds to saturation in the positive sense, reduced again to zero, increased to saturation in the negative sense, and again reduced to zero. From the hysteresis diagram of FIGURE 1 it can be seen that a thin film when operated along its difficult axis exhibits two relatively flat saturable portions which occur on the low oersted regions for this reason and since the hysteresis power loss, which is proportional to the area enclosed by loop 10 is quite small, the film core when cycled by a field oriented in the hard or difficult direction is quite suitable for use as a transformer core. Also, since the films prepared as indicated in the aforereferenced application are extremely thin (of the order of 2000 A.), eddy current losses are negligible.

This mode of operation is distinguished from the normal operation of thin film magnetic elements in the digital computing field. In normal operation, the thin film core element is cycled by an external magnetizing field aligned with the "easy" direction of the film. When operated in this manner, the resulting hysteresis loop is found to be quite rectangular, i.e., the remanent flux density approaches the value of the flux density at saturation to a high degree. The square loop properties of thin ferromagnetic films lend themselves quite readily to binary computer applications, for example in magnetic memory and switching circuitry.

Before describing in detail the operation of an exemplary circuit, an explanation of the manner in which the saturable transformer properties of the individual film cores which form the active elements of the circuit are utilized may aid the reader in understanding of the circuit operation. It is again emphasized that although the preferred embodiment utilizes thin anisotropic deposited ferromagnetic films, limitation thereto is not necessary nor intended.

Figure 2:
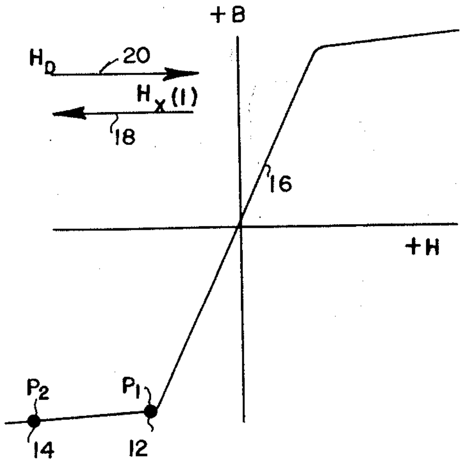
FIGURE 2 illustrates the direction of application of the drive and bias fields to those films initially biased to the $P_1$ state.

Certain predetermined film elements of the translating matrix are initially biased by having a magnetic field applied thereto such that the magnetization is established at point 12 on the idealized hysteresis loop of FIGURE 2. The state identified by point 12 is, for convenience, termed the $P_1$ state and is slightly more negative than the knee of the loop. Now if another field is applied in a negative sense to a film initially in its $P_1$ state in a direction aligned with the difficult axis of said film, the magnetization will be further driven in its negative saturation region to a point such as point 14 which may be termed the $P_2$ state, resulting in a relatively small change in flux. However, if said second field is applied in a positive sense to a film initially in its $P_1$ state, the magnetization will be shifted into its high permeability region indicated generally by the line 16 of FIGURE 2. Under this latter circumstance, a relatively large change in flux occurs thereby inducing a substantial signal in a suitably arranged sense winding cooperating with said film.

Figure 3:
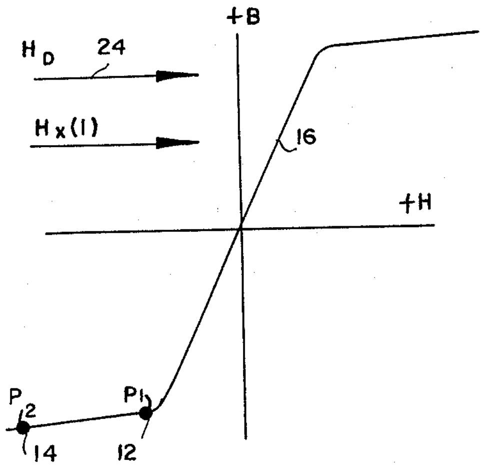
FIGURE 3 illustrates the direction of application of the drive and bias fields to those films initially biased to the $P_2$ state.

In FIGURE 2, the vector 18 represents the field which shifts the magnetization from the $P_1$ state to the $P_2$ state whereas vector 20 represents the field required to shift the magnetization from the $P_1$ state to the high permeability region 16 of the hysteresis characteristic curve. FIGURE 3 is intended to illustrate the field conditions for those films in the matrix which are initially biased to their $P_2$ states. In this case the application of the bias field $H_x(1)$ indicated by vector 22 merely causes the magnetization to shift from the $P_2$ state 14 to the $P_1$ state 12, resulting in negligible flux change. Both fields $H_x(1)$ and drive field $H_D$ indicated by vector 24 are required to shift the magnetization of the film to the high permeability region and to produce an output signal on the sense line. The reason the particular symbol designation given to the various fields will become apparent in connection with the detailed description of the circuit of FIGURE 4. It is apparent that by selectively applying biasing and drive fields of various strengths and directions, many combinations of input signals may be derived, the net result of which will either produce or not produce an output signal therefrom, i.e., propagate a particular signal therethrough.

Figure 4:
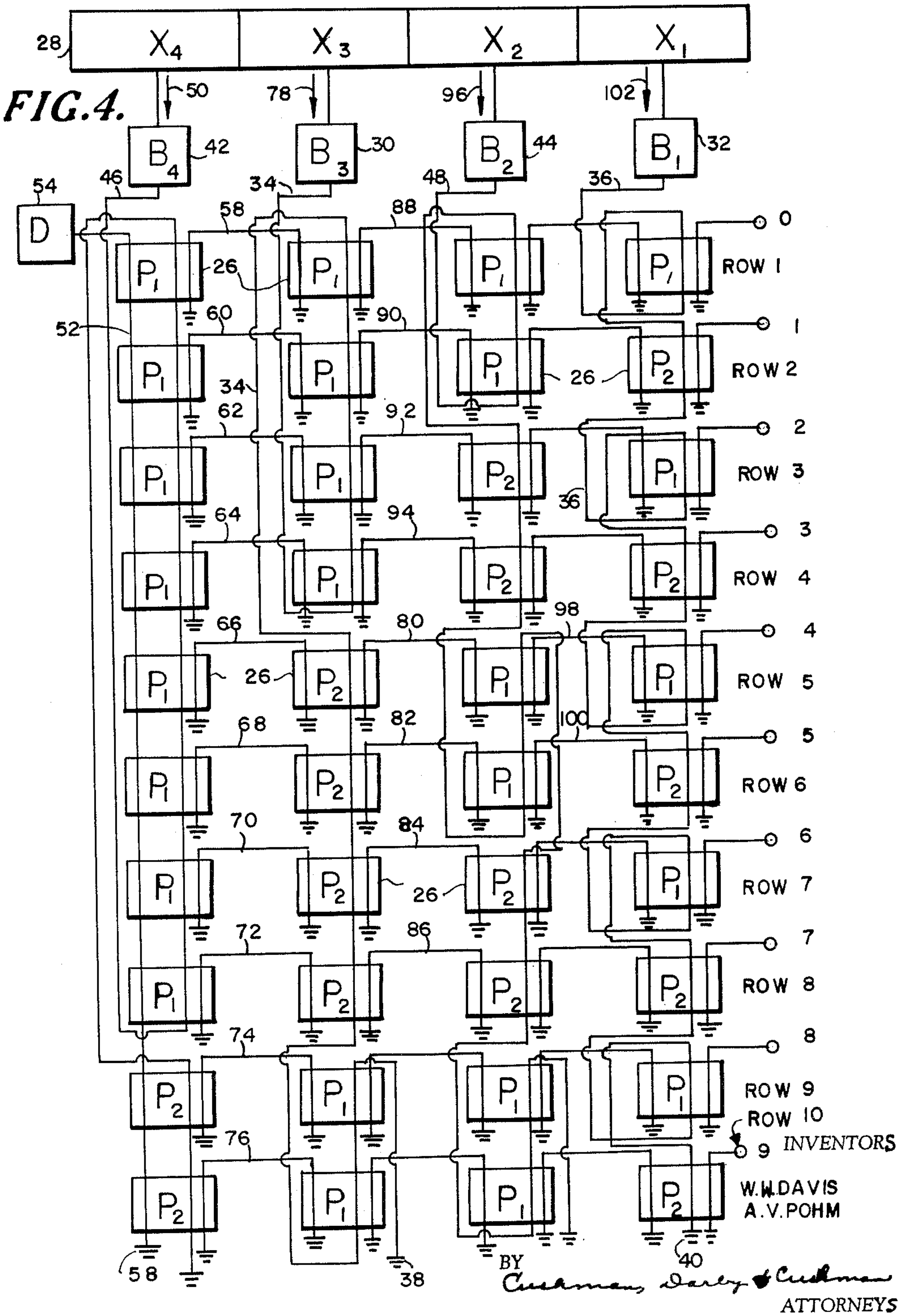
FIGURE 4 shows an exemplary embodiment of the present invention.

Referring now to FIGURE 4 in which is shown an exemplary embodiment of this invention, it can be seen that there is a cascaded matrix arrangement of thin film saturable transformers 26. The particular arrangement of ten rows and four columns is sufficient to translate the binary code permutations to any one of ten decimal characters (0–9). It is of course obvious that a translator of larger or smaller capacity may be constructed without departing from the scope of the invention by merely increasing or decreasing the number of rows and columns respectively.

Table I below shows the binary representation of the decimal digits 0 through 9.

*Table I*

| Decimal: | Binary | Decimal: | Binary |
|---|---|---|---|
| 0 | 0000 | 5 | 0101 |
| 1 | 0001 | 6 | 0110 |
| 2 | 0010 | 7 | 0111 |
| 3 | 0011 | 8 | 1000 |
| 4 | 0100 | 9 | 1001 |

Referring to FIGURE 4, the binary word to be translated is entered into an external register 28 which may be comprised of a plurality of bistable flip-flop circuits which are quite well known in the art, there being one flip-flop or its logical equivalent for each digit position. The digit positions are indicated by the symbols $X_1$ through $X_4$, $X_1$ being the lowest order digit position and $X_4$ being the highest order digit position. Connected to the "one" side of said flip-flop stages are a plurality of bias generators $B_1$ through $B_4$, there being one such current generator for each digit position. The operation of the bias generators are such that when a "1" is stored in a particular stage of register 28, its associated bias generator causes a current to flow in the output line connected thereto. However, when a "0" is stored in a particular stage of register 28, its associated bias generator remains inactive such that no current flows through the particular bias line connected thereto. For example, if the binary number 0101 is stored in register 28, bias generators 30 and 32 cause a current to flow through control lines 34 and 36 to ground at points 38 and 40 respectively. However, since a "0" is stored in stages $X_4$ and $X_2$, bias generators 42 and 44 remain inactive and hence no current flows through their associated control lines 46 and 48 respectively.

Since the outputs from bistable circuits such as flip-flops are usually two discrete voltage levels it is possible to use said outputs directly to furnish the biasing currents thereby eliminating the need for separate bias generators. However, to provide additional control over the magnitude of the bias current, separate generators are preferred; however limitation thereto is not intended.

It is well known that current flowing through a conductor causes a magnetic field to exist in the neighborhood of said current carrying conductor. Use is made of the field resulting from the flow of current through the control lines to shift the magnetization of the thin films located in close proximity thereto as has been previously described in connection with FIGURES 2 and 3. The $H_x(1)$ field, having a direction as indicated by vector 18 when applied to the films initially biased in the $P_1$ state, and having a direction as indicated by vector 22 when applied to the films initially biased in the $P_2$ state, is the field resulting from the flow of current through the control lines associated with the bias generators having a "1" input from word register 28. Alternatively the fields could result from current flow therein due to a "0" input from word register 28.

Since it is necessary that the field $H_x(1)$ act in one direction on films initially biased in the $P_1$ state (the direction of vector 18) and in the opposite direction on films initially biased to the $P_2$ state (the direction of vector 22), the control lines 34, 36, 46 and 48 are arranged such that a current flowing in one direction, say in the direction from the bias generators $B_1$ through $B_4$ to ground, flows upward in those areas in close proximity to the $P_1$ biased films and downward in the areas in close proximity to the $P_2$ biased films. By using the right hand rule and assuming a direction of current flow through the bias lines, it can be seen that the resulting bias fields $H_x(1)$ will act in opposite directions on the $P_1$ films and on the $P_2$ films.

When Table I is compared with the matrix of FIGURE 4, the particular scheme used to determine the initial bias state of film cores 26 becomes immediately evident. For the sake of clarity in the drawing of FIGURE 4, the current conducting lines and associated bias generators used to establish the bias states in the films are not shown.

Magnetically associated with the saturable transformer devices in the highest order or most significant bit position, i.e., the films in column 50, is an input current carrying conductor 52 which receives its energy from a drive generator 54. When supplied with a current, line 52 which is inductively coupled to each film in column 50 in the same direction causes the magnetic field $H_D$ indicated by vectors 20 and 24 of FIGURES 2 and 3 respectively to be applied thereto.

All films 26 in each row are coupled in cascade in the same magnetic direction by jumpers, see for example jumper 58 between the top films 26 of columns 50 and 78. The output signal which may result upon the application of both a bias field and a drive field to the films in the highest order or most significant bit positions is coupled via a jumper to the next lower significant digit position and functions as an input drive signal thereto. Likewise, an output signal which may be produced by the shifting of the magnetization of the second most significant digit position film into its high permeability region is coupled to the third most significant digit position film via a jumper and therefore serves as an input signal thereto.

Films 26 may all be deposited or otherwise fixed to a plane substrate; for example, as taught in the Rubens Patent No. 2,900,282. Conventional printed circuit copper etching techniques may then be used to form the necsary windings such as drive winding 52, control windings 34, 36, 46, and 48 and jumper windings. In the Rubens et al. application, Serial No. 626,945, filed December 7, 1956 now Patent No. 3,030,612, the general method of constructing operable thin film devices wherein printed circuits are used as the current carrying conductors is described. Related techniques may be utilized in constructing the translator of this invention.

To pursue the previous example further so as to show the steps occurring in the translating operation, again assume the binary word 0101 has been entered into the external register 28. As mentioned before, with this particular code permutation contained in register 28, bias generators 30 and 32 supply a current to their associated control windings 34 and 36 whereas no current flows in lines 46 and 48. The effect of the resulting biasing field caused by current flowing in windings 34 and 36 is to cause the magnetization of those films initially biased to the $P_1$ state, represented by point 12 of FIGURE 2, to shift to the $P_2$ state represented by point 14 of FIGURE 2. Similarly, the bias field causes the magnetization of the films initially biased to the $P_2$ state to shift from the $P_2$ state to the $P_1$ state as shown in FIGURE 3.

After the bias condition has been established, drive generator 54 is activated and a current flows through drive winding 52 to ground terminal 58 and establishes the field $H_D$ in the neighborhood of all films in column 50. Since no biasing field $H_x(1)$ has been applied to the films in column 50, the drive field $H_D$ causes the magnetization of the films initially biased to the $P_1$ state to shift into their high permeability region thereby producing a substantial output signal on jumper lines 58 through 72. Those films in column 50 which were initially biased to their $P_2$ states, upon receipt of the drive field $H_D$, merely have their magnetization shifted to the $P_1$ state and hence do not produce a substantial output signal on their associated jumper lines 74 and 76.

Since all the films in column 78 receive a bias field due to a "1" in the position $X_3$, the films which were initially biased to their $P_1$ state have their magnetization shifted to the $P_2$ state due to the action of the bias field $H_x(1)$. Those films in column 78 which were initially biased to their $P_2$ state have their magnetization shifted to the $P_1$ state by the action of the bias field $H_x(1)$. Now, upon receipt of the drive signal which was induced in jumper lines 58 through 72 due to the shifting of the magnetization of the films respectively coupled to their high permeability region, the films in column 78 which were initially biased to their $P_2$ state but had their magnetization shifted to their $P_1$ state by the field $H_x(1)$ produce a substantial output on jumper lines 80 through 86 since the effect of the above-mentioned drive signal is to produce a field directed as $H_D$ which shifts the magnetization of the films associated with these jumper lines to their high permeability region. Because the effect of the drive pulses on jumper lines 58 through 64 is merely to shift the magnetization of the films in column 78 associated with these jumpers back to their $P_1$ state, no substantial output appears on jumper lines 88 through 94.

Since in all cases a drive field $H_D$ is required to allow propagation of a signal from film to film, it is obvious that no further signal propagation can occur between the films in rows 1, 2, 3, 4, 9 and 10. As mentioned previously, no bias field is generated by current flowing through bias line 48. Hence, when the drive field is received over jumper lines 80 through 86 only those films initially biased to their $P_1$ states, i.e., the films at the intersections of column 96 and rows 5 and 6, will have their magnetization shifted into their high permeability region and thereby produce an output signal on jumper lines 98 and 100.

By following the same type of analysis it can be seen that since a bias field is exerted on all the films located in column 102 by virtue of the fact that a "1" is stored in the $X_1$ stage of register 28, an output will be produced only on output line 104 (row 6). An output on this particular line is indicative of the fact that the binary number 0101 when translated into the decimal number system is the numeral 5. This can be checked by referring to Table I.

Similarly, if any other of the binary code permutations shown in Table I are entered into the external register 28, one and only one of the output lines whose terminals are labeled 0 through 9 will receive an output thereon subsequent to the application of a drive current from generator 54. The output line which receives a signal will in all cases be the decimal number corresponding to the particular binary code permutation entered into the external register 28.

Because of the attenuation characteristics of saturable transformer devices, it may be necessary to insert signal amplifying means periodically between the output winding of one device and the input winding to the next device to insure that the drive signal is properly propagated.

It will be apparent that a modification which may be performed within the scope of this invention is to rearrange the films so as to form a three-dimensional matrix thereby reducing the number of windings on each film. In this respect by a proper rearrangement of the matrix illustrated in FIGURE 4 the same bias lines can be made to service a pair of film elements at a time.

Reference to columns and rows in the appended claims is used in the sense of electrical interconnection and it is not limited to physical disposition.

Thus it can be seen that there is provided a means whereby the various objects and advantages enumerated above can successfully be achieved. Other modifications of this invention may become apparent to those skilled in the art after reading this specification. It is therefore intended that the foregoing descriptive matter be deemed illustrative and not limitive, the scope of the invention being defined in the appended claims.

What is claimed is:

1. Apparatus for receiving signals on a plurality of input lines and generating a related signal upon at least one of a plurality of output lines comprising a matrix having a column for each input line and a row for each output line, a discrete device for blocking or propagating signals for each matrix intersection, a source of driving signals and means connected thereto for coupling a driving signal therefrom to the devices of one column, means for coupling to the devices of each column signals from only one input line, means intercoupling the devices of each row in groups less than all the devices of the row, and means coupling at least one device of each row to a different output line, the arrangement being such that dependent upon the states of the several devices a signal will or will not be propagated through said intercoupling means to said output line.

2. Apparatus as in claim 1 wherein said devices are saturable transformer devices.

3. Apparatus as in claim 1 wherein said devices are of the thin film ferromagnetic anisotropic type.

4. Apparatus as in claim 3 wherein said thin film devices are operated along the hard axis of magnetization.

5. Apparatus for receiving signals upon a plurality of input lines and generating a related signal upon an output line comprising, a plurality of discrete saturable transformer devices arranged in a matrix array of rows and columns, means coupling at least one device to each input line, means for intercoupling all the several devices in each column in groups less than all said devices, means for establishing the devices in selected states of saturation, and means coupling at least one device but less than all to the output line, the arrangement being such that dependent upon the states of the several devices a signal will or will not be propagated through said intercoupling means to said output line.

6. Apparatus as in claim 5 wherein the transformer devices are caused to reside normally in such state of saturation that additional magnetomotive force applied thereto in a first direction generates slight flux change therein but the magnetomotive force applied in a second direction generates significantly greater flux change.

7. Apparatus as in claim 6 wherein the devices are of the thin film type.

8. Apparatus for receiving signals upon a plurality of input lines and generating a related signal upon an output line comprising, a plurality of discrete devices arranged in a matrix array of rows and columns for selectively permitting or blocking signal propagation, means for intercoupling all the several devices of each of said columns in groups less than all said devices, means for selectively establishing the devices in a state to propagate or block signals appearing on said intercoupling means, and means coupling at least one device but less than all to the output line, the arrangement being such that dependent upon the states of the several devices a signal will or will not be propagated through said intercoupling means to said output line.

9. Apparatus for converting from a first system of notation to a second notation system including a register for retaining the bits of a word in binary form, a matrix having a column for each bit of the word, the matrix having a row for each second system output, each matrix intersection having a discrete device for controlling propagation of signals, means intercoupling each device of each row with only the next adjacent device of the row with the last device therein coupled to an output line, means coupling each of the devices of each row to a bit of the register, and means for establishing the devices in states to form words according to the first system of notation, the arrangement being such that dependent upon the states of the several devices a signal will or will not be propagated through said intercoupling means to said output lines.

10. Apparatus as in claim 9 wherein the devices are saturable transformer devices.

11. Apparatus as in claim 9 wherein the devices are of the thin film ferromagnetic anisotropic type.

12. Apparatus as in claim 11 wherein the devices are operated along the difficult axis of magnetization.

13. Apparatus for receiving signals on a plurality of input lines and generating a related signal upon at least one of a plurality of output lines comprising a matrix having a column for each input line and a row for each output line, a discrete saturable transformer device for each matrix intersection, the devices in each row being placed in states of saturation according to a binary code representation, the arrangement being such that each row stores a different binary word and each of all the contemplated binary words are stored in some row of the matrix, means intercoupling the transformer devices in each row to the next adjacent device for propagating a signal thereto, means coupling only the last device in each row to a different output line, and means coupled to the devices of the column representing the most significant digit for activating the intercoupling means associated with the transformer devices which have achieved correspondence with the input signal placed thereon, the arrangement being such that the signals caused by said intercoupling means activation propagates along each row to the next successive device, and continues so propagating in those rows where transformer device correspondence is achieved with the respective input signals thereon, said propagating signals being blocked where there is no correspondence, the end result being the activation of the output line associated with the row of devices in which complete correspondence is achieved.

14. Apparatus as in claim 13 wherein at each intersection the transformer device comprises a thin film of magnetic material.

15. In a digital data circuit, a plurality of discrete magnetically saturable transformer devices arranged in a matrix array of rows and columns each device having an input, control and output winding, a signal source coupled to the input windings of all of the devices of only one column, discrete means coupling the output winding of each device to the input winding of one of the remaining devices and means for controlling the current in the respective control windings, the arrangement being such that by selection of current magnitudes in the input and control windings of each device to operate the devices in predetermined relation to their saturation characteristics, a signal from said source will be propagated through a predetermined number of devices.

16. Apparatus as in claim 15 wherein said devices are of the thin ferromagnetic type.

References Cited in the file of this patent

UNITED STATES PATENTS

| | | |
|---|---|---|
| 2,782,399 | Rajchman | Feb. 19, 1957 |
| 2,846,671 | Yetter | Aug. 5, 1958 |
| 2,914,754 | Ganzhorn et al. | Nov. 24, 1959 |

FOREIGN PATENTS

| | | |
|---|---|---|
| 1,190,683 | France | Apr. 6, 1959 |

OTHER REFERENCES

"Proceedings of Eastern Joint Computer Conference," December 10–12, 1956, pp. 120–123.